(12) United States Patent
Hamada et al.

(10) Patent No.: US 11,351,695 B2
(45) Date of Patent: Jun. 7, 2022

(54) DECORATIVE MEMBER AND MANUFACTURING METHOD OF DECORATIVE MEMBER

(71) Applicant: Yamaha Fine Technologies Co., Ltd., Hamamatsu (JP)

(72) Inventors: Yutaka Hamada, Shizuoka (JP); Masahiro Hirato, Hamamatsu (JP); Yoshihito Yamamoto, Iwata (JP)

(73) Assignee: Yamaha Fine Technologies Co., Ltd., Hamamatsu (JP)

( * ) Notice: Subject to any disclaimer, the term of this patent is extended or adjusted under 35 U.S.C. 154(b) by 0 days.

(21) Appl. No.: 16/784,592

(22) Filed: Feb. 7, 2020

(65) Prior Publication Data
US 2020/0198173 A1 Jun. 25, 2020

Related U.S. Application Data

(63) Continuation of application No. PCT/JP2018/028344, filed on Jul. 27, 2018.

(30) Foreign Application Priority Data

Aug. 8, 2017 (JP) .............................. JP2017-153673

(51) Int. Cl.
*B27M 1/08* (2006.01)
*B32B 21/14* (2006.01)
(Continued)

(52) U.S. Cl.
CPC .............. *B27M 1/08* (2013.01); *B32B 3/266* (2013.01); *B32B 21/08* (2013.01); *B32B 21/14* (2013.01); *B44C 1/228* (2013.01); *B44C 5/043* (2013.01); *F21V 3/00* (2013.01); *F21V 11/14* (2013.01); *G09F 13/04* (2013.01);
(Continued)

(58) Field of Classification Search
CPC ..... B32B 3/266; B32B 21/14; B32B 2255/08; B32B 2307/406; B32B 2307/412; B32B 2451/00; B44C 5/043; Y10T 428/24273; F21W 2121/00
See application file for complete search history.

(56) References Cited

U.S. PATENT DOCUMENTS

2008/0070013 A1* 3/2008 Suga .................... B32B 3/30
428/209

FOREIGN PATENT DOCUMENTS

DE     10 2008 041 701 A1    3/2010
EP         0 061 889 A1    8/2016
(Continued)

OTHER PUBLICATIONS

[NPL-1] Yamaoka (JP 2000-214803 A); Aug. 2000 (EPO machine translation to English). (Year: 2000).*

(Continued)

*Primary Examiner* — David Sample
*Assistant Examiner* — Donald M Flores, Jr.
(74) *Attorney, Agent, or Firm* — Crowell & Moring LLP

(57) ABSTRACT

A decorative member according the present disclosure includes: a wooden veneer having a plurality of through-holes which transmit light from a back face side to a front face side; a transparent reinforcing layer laminated to a back face side of the veneer; and a coating layer which is laminated to a front face side of the veneer and fills interiors of the plurality of through-holes.

7 Claims, 3 Drawing Sheets

(51) Int. Cl.

| | |
|---|---|
| *B32B 3/26* | (2006.01) |
| *B32B 21/08* | (2006.01) |
| *F21V 11/14* | (2006.01) |
| *F21V 3/00* | (2015.01) |
| *B44C 5/04* | (2006.01) |
| *G09F 13/04* | (2006.01) |
| *B44C 1/22* | (2006.01) |
| *F21Y 115/10* | (2016.01) |
| *B60R 13/02* | (2006.01) |
| *F21W 121/00* | (2006.01) |

(52) U.S. Cl.
CPC ....... *B32B 2255/08* (2013.01); *B32B 2255/24* (2013.01); *B32B 2307/406* (2013.01); *B32B 2307/412* (2013.01); *B32B 2451/00* (2013.01); *B60R 13/02* (2013.01); *F21W 2121/00* (2013.01); *F21Y 2115/10* (2016.08); *G09F 13/044* (2021.05); *Y10T 428/24273* (2015.01)

(56) References Cited

FOREIGN PATENT DOCUMENTS

| EP | 3 061 889 A1 | | 8/2016 | | |
|---|---|---|---|---|---|
| EP | 3061889 A1 | * | 8/2016 | ............. | B32B 27/30 |
| GB | 2289008 A | * | 11/1995 | ............... | B05D 1/20 |
| JP | 5-257429 A | | 10/1993 | | |
| JP | 2000-214803 A | | 8/2000 | | |
| JP | 2000214803 A | * | 8/2000 | | |
| JP | 2004-213964 A | | 7/2004 | | |
| JP | 2005-62441 A | | 3/2005 | | |
| JP | 2008-23922 A | | 2/2008 | | |
| JP | 2011-196976 A | | 10/2011 | | |

OTHER PUBLICATIONS

[NPL-2] Reinhardt (EP 3061889 A1); Aug. 2016 (EPO machine translation to English). (Year: 2016).*
Partial Supplemental European Search Report issued in European Application No. 18843045.8 dated Mar. 19, 2021 (12 pages).
Chinese-language Office Action issued in Chinese Application No. 201880051470.7 dated Jan. 8, 2021 with English translation (22 pages).
International Search Report (PCT/ISA/210) issued in PCT Application No. PCT/JP2018/028344 dated Oct. 2, 2018 with English translation (three (3) pages).
Japanese-language Written Opinion (PCT/ISA/237) issued in PCT Application No. PCT/JP2018/028344 dated Oct. 2, 2018 (five (5) pages).
Japanese-language Office Action issued in Japanese Application No. 2017-153673 dated May 11, 2021 with English translation (eight (8) pages).
Supplementary European Search Report issued in European Application No. 18843045.8 dated Jul. 2, 2021 (nine (9) pages).
Chinese-language Office Action issued in Chinese Application No. 201880051470.7 dated Aug. 31, 2021 with English translation (14 pages).
Chinese-language Office Action issued in Chinese Application No. 201880051470.7 dated Feb. 15, 2022 with English translation (18 pages).

* cited by examiner

DECORATIVE MEMBER AND MANUFACTURING METHOD OF DECORATIVE MEMBER

CROSS-REFERENCE TO RELATED APPLICATIONS

This application is a continuation application of International Application No. PCT/JP2018/028344, filed on Jul. 27, 2018, which claims priority to Japanese Patent Application No. 2017-153673 filed in Japan on Aug. 8, 2017. The entire disclosures of International Application No. PCT/JP2018/028344 and Japanese Patent Application No. 2017-153673 are hereby incorporated herein by reference.

BACKGROUND

Technical Field

The present disclosure relates to a decorative member and a manufacturing method of a decorative member.

Background Information

There are instances of decorative members being used as, for example, panels and the like that leverage woodgrain as a design element for the interiors of automobiles and the like. In addition, there are cases of, for instance, wishing to incorporate warning lights or the like, or make character information displayable on such decorative members.

Japanese Laid-Open Patent Application No. 2005-62441, for example, discloses a display device including a board with a plurality of LEDs (illuminators), arranged in a matrix or a shape of characters or graphics, and a sheet member that is positioned in front of the board and transmits light from the LEDs. The sheet member includes a transparent synthetic resin substrate, a black coating layer formed on one surface of the substrate, and an image display layer with a printed woodgrain design on another surface of the substrate. Light projection holes (through-holes) are systematically formed across an entire surface of the display device.

For the display device described in the above document, when the LEDs are turned off, a woodgrain design is visible, and when the LEDs are lit, characters or graphics depicted by the LEDs, which illuminate, are visible. Unfortunately, for this display device, since light from the LEDs is emitted forward through the light projection holes, which are minute, an angle of visibility is small, and the characters or graphics depicted by the LEDs cannot be clearly identified unless viewed from directly in front of the light projection holes. Even with this display device, it would be possible to increase the angle of visibility by enlarging a diameter of the light projection holes; however, this would introduce a problem of making the light projection holes stand out when the LEDs were turned off, impairing the design.

SUMMARY

In view of the aforementioned problems, an object of the present disclosure is to provide a decorative member with a large angle of visibility at which light from a back face side can be seen, as well as a manufacturing method of the decorative member.

A decorative member according to one aspect of the present disclosure includes: a veneer made of wood having a plurality of through-holes which transmit light from a back face side to a front face side; a transparent reinforcing layer laminated to a back face side of the veneer; and a coating layer which is laminated to a front face side of the veneer and fills interiors of the plurality of through-holes.

In addition, a manufacturing method of a decorative member according to an other aspect of the present disclosure includes: irradiating a veneer made of wood with a laser beam to form a plurality of through-holes; laminating a transparent reinforcing layer to a back face side of the veneer in which the plurality of through-holes have been formed; and applying a paint onto a front face side of the veneer to which the reinforcing layer has been laminated.

DESCRIPTION OF EMBODIMENTS

Figure 1:
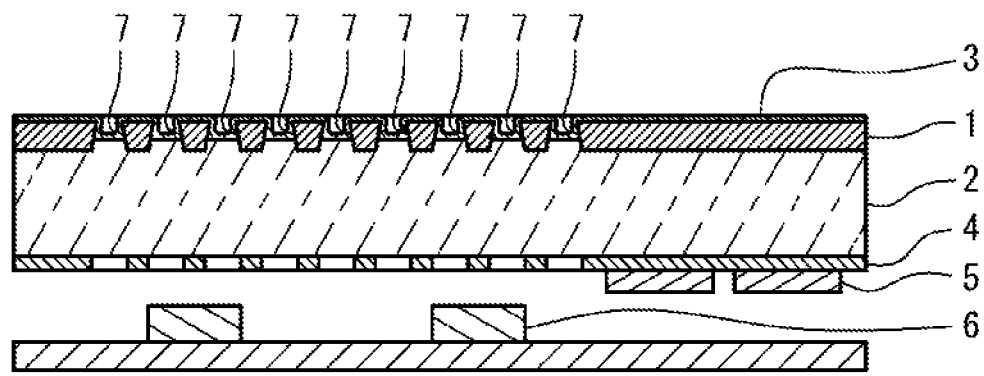
FIG. 1 is a schematic cross-sectional view of a decorative member according to an embodiment of the present invention.

Hereinafter, embodiments of the present disclosure will be described in detail with reference to a drawing or drawings as appropriate.

The decorative member according to one aspect of the present disclosure includes: a veneer made of wood having a plurality of through-holes that transmit light from a back face side to a front face side; a transparent reinforcing layer laminated to a back face side of the veneer; and a coating layer which is laminated to a front face side of the veneer and fills interiors of the plurality of through-holes.

In the decorative member, the coating layer may include a light diffusing agent.

In the decorative member, a percentage content of the light diffusing agent in the coating layer is preferably 5% by mass or more and 15% by mass or less.

A specular glossiness of the coating layer is preferably 1 or more and 30 or less.

The decorative member preferably includes a region in which an average diameter of the plurality of through-holes on the front face side of the veneer is 0.10 mm or more and 0.40 mm or less, and an aperture percentage due to the plurality of through-holes is 3% or more and 20% or less.

In the decorative member, at least some of the plurality of through-holes may be tapered.

The decorative member may further include a masking layer which is laminated to a back face side of the reinforcing layer and partially shields light directed from the back face side to the front face side.

The decorative member may further include an illuminator which irradiates the back face side of the veneer with the light.

A manufacturing method according to another aspect of the present disclosure includes: irradiating a veneer made of wood with a laser beam to form a plurality of through-holes; laminating a transparent reinforcing layer to a back face side of the veneer in which the plurality of through-holes have been formed; and applying a paint onto a front face side of the veneer to which the reinforcing layer has been laminated.

It is to be noted that "fills interiors of the plurality of through-holes" as referred to herein means being present in continuity into the plurality of through-holes, and does not necessitate the entirety of the interior space of the plurality of through-holes being filled. In addition, "average diameter" as referred to herein means an equivalent circle diameter, and refers to the average diameter of apertures on front face sides of a plurality of through-holes in a region provided with the plurality of through-holes. In addition, "aperture percentage due to the plurality of through-holes" as referred to herein means a percentage, with respect to an area of a polygon formed by lines connecting centers of the plurality of through-holes on an outer edge of the region provided with the plurality of through-holes, of an area of the apertures on the front face sides of the plurality of through-holes within the polygon. Hereafter, the aperture percentage due to the plurality of through-holes will be referred to simply as "aperture percentage." "Specular glossiness" is a value measured, in accordance with JIS-Z8741 (1997), with an angle of incidence of 60°.

The decorative member according to the one aspect of the present disclosure and the decorative member obtained through the manufacturing method of the same according to the other aspect of the present disclosure are able to, due to the plurality of through-holes formed in the veneer, transmit light (for example, light from an illuminator) from the back face side of the veneer. In addition, as the coating layer is laminated to the front face side of the veneer and fills the interiors of the plurality of through-holes, diffusion of light emitted from the plurality of through-holes is permitted, creating a large angle of visibility at which light from the back face side can be seen.

First Embodiment

FIG. 1 shows a decorative member according to an embodiment of the present invention. The decorative member can be used as, for example, an interior panel (e.g., on door trim, a decorative cover for a center control panel, a decorative cover for a dashboard, etc.) for automobiles and the like, and can have functions as a warning display for seatbelts, door locks, and the like, in combination with a display device for features such as air conditioning, audio, and the like.

The decorative member includes a veneer 1 made of wood, a transparent reinforcing layer 2 laminated to a back face side of the veneer 1, a coating layer 3 laminated to a front face side of the veneer 1, a masking layer 4 laminated to a back face side of the reinforcing layer 2, a touch sensor 5 installed on the back face side of the masking layer 4, and an illuminator 6 installed further toward the back face side of the touch sensor 5.

Veneer

The veneer 1 has a plurality of through-holes 7 that transmit light from the illuminator 6 to the front face side. Innermost portions of the plurality of through-holes 7 are filled with the coating layer 3 so as to cover the front face side of the reinforcing layer 2.

In terms of a material for the veneer 1, for example, a rotary veneer obtained by cutting a log circumferentially so as to peel it, a sawn veneer obtained by cutting raw timber with a saw, a sliced veneer obtained by slicing raw timber with a sharp cutter, or the like may be used. It is possible to make a rotary veneer with a width greater than the thickness of the raw timber, and thus large rotary veneers can be obtained at relatively low cost. Accordingly, using a rotary veneer as the aforementioned veneer enables relatively easy and affordable enlargement of the decorative member. In addition, by using a rotary veneer as the aforementioned veneer, it is possible to inhibit deformation of the decorative member due to changes in humidity or a passage of time. In a case in which a rotary veneer is used as the aforementioned veneer, the decorative member will have a veneer that is similar to a cross-grain board from natural wood and has relatively stable quality. On the other hand, by using a sawn veneer or a sliced veneer as the aforementioned veneer, it is possible to make the vibration characteristics of the decorative member approximate those of a straight-grain board from natural wood, which is suitable for use as an instrument soundboard.

A type of wood for the veneer 1 is not particularly limited, and a type that enables the desired design to be obtained may be selected, but exemplary types include walnut, maple, ash, and the like.

The lower limit of an average thickness of the veneer 1 is preferably 0.10 mm and more preferably 0.15 mm. The upper limit of the average thickness of the veneer 1 is preferably 2.0 mm and more preferably 1.0 mm. In a case in which the average thickness of the veneer 1 is less than the lower limit, there is a risk that processing may become more difficult or that the woodgrain may become less apparent, making the design insufficient. Conversely, in a case in which the average thickness of the veneer 1 is greater than the upper limit, there is a risk that the filling of the plurality of through-holes 7 with the paint may be incomplete, whereby wide-angle diffusion of light from the illuminator 6 and creating a sufficient angle of visibility may fail.

Through Holes

It is preferred that the plurality of through-holes 7 of the veneer 1 are formed such that central axes of the plurality of through-holes 7 extend in a thickness direction of the veneer 1. In addition, it is preferred that the plurality of through-holes 7 are formed systematically with a constant pitch over a wide region. The plurality of through-holes 7 may be arranged at tetragonal lattice points with regular vertical and horizontal intervals, or at hexagonal lattice points with regular 60° intervals. In addition or alternatively, placement of the plurality of through-holes 7 may be such that intervals differ according to direction.

Further, at least some of the plurality of through-holes 7 may be formed in a tapered shape. Forming the at least some of the plurality of through-holes 7 in a tapered shape enables an increase in the angle of visibility of the decorative member. In the decorative member according to this embodiment of the present invention, the plurality of through-holes 7 are formed with a tapered shape in which their diameters expand toward the back face side. By having the plurality of through-holes 7 be tapered in this manner, with diameters that expand toward the back face side, the apertures of the plurality of through-holes 7 on the front face side of the veneer 1 become smaller; accordingly, the angle of visibility is increased while the plurality of through-holes 7 are made less visible.

The lower limit of the average diameter of the plurality of through-holes 7 on the front face side of the veneer 1 is preferably 0.10 mm and more preferably 0.15 mm. The upper limit of the average diameter of the plurality of through-holes 7 on the front face side of the veneer 1 is preferably 0.40 mm and more preferably 0.30 mm. In a case in which the average diameter of the plurality of through-holes 7 on the front face side of the veneer 1 is less than the lower limit, it may become difficult to form the coating layer 3 such that it is present in continuity into the interiors of the plurality of through-holes 7. Conversely, in a case in which the average diameter of the plurality of through-holes 7 on the front face side of the veneer 1 is greater than the upper limit, the plurality of through-holes 7 may stand out when the illuminator 6 is turned off, possibly impairing the design of the decorative member.

The lower limit of the aperture percentage on the front face side of the region provided with the plurality of through-holes of the veneer 1 is preferably 3% and more preferably 5%. The upper limit of the aperture percentage on the front face side of the region provided with the plurality of through-holes of the veneer 1 is preferably 20%, more preferably 15%, and still more preferably 10%. In a case in which the aperture percentage on the front face side of the region provided with the plurality of through-holes of the veneer 1 is less than the lower limit, the amount of light transmitted through the plurality of through-holes 7 may be reduced, possibly leading to insufficient visibility when the illuminator 6 of the decorative member is illuminated. Conversely, in a case in which the aperture percentage on the front face side of the region provided with the plurality of through-holes of the veneer 1 is greater than the upper limit, the decorative member may not be able to achieve a texture of wood when the illuminator 6 is turned off.

As described above, the decorative member includes, in the veneer 1, the plurality of through-holes 7 with the average diameter in the preferred range, giving it an aperture percentage within the preferred range. Accordingly, sufficient visibility of the decorative member can be obtained when the illuminator 6 is illuminated, and because the plurality of through-holes will not stand out even when the illuminator 6 is turned off, the texture of wood will not be lost.

The plurality of through-holes 7 arranged at the aforementioned tetragonal lattice points, hexagonal lattice points, or the like are placed with suitable spaces between them. The average value of these spaces between the plurality of through-holes 7 (separation distances) will be referred to as "average center-to-center spacing." The "average center-to-center spacing" refers to the average separation distance value between the centers of the plurality of through-holes 7 that are adjacent and the shortest distance away from each other. The range of the average center-to-center spacing will necessarily be obtained from the combination of the aforementioned preferred average diameter range and preferred aperture percentage range of the plurality of through-holes 7 that have been arranged.

On the other hand, a preferred range for the average center-to-center spacing can be set from the perspective of its effects with regard to the decorative member. The lower limit of the average center-to-center spacing of the plurality of through-holes 7 is preferably 0.3 mm and more preferably 0.4 mm. The upper limit of the average center-to-center spacing of the plurality of through-holes 7 is preferably 1.0 mm and more preferably 0.8 mm. In a case in which the average center-to-center spacing of the plurality of through-holes 7 is less than the lower limit, it may become more difficult to form the plurality of through-holes 7, and/or the strength of the veneer 1 may become insufficient, possibly leading to a drop in the yield rate of the decorative member during manufacturing. In a case in which the average center-to-center spacing of the plurality of through-holes 7 is greater than the upper limit, the amount of light transmitted through the plurality of through-holes 7 may be reduced, possibly leading to insufficient visibility when the decorative member is illuminated by the illuminator 6.

The lower limit of a taper angle of the plurality of through-holes 7 is preferably 1° and more preferably 2°. The upper limit of the taper angle of the plurality of through-holes 7 is preferably 50° and more preferably 45°. In a case in which the taper angle of the plurality of through-holes 7 is less than the lower limit, the effect of increasing the angle of visibility may be insufficient. Conversely, in a case in which the taper angle of the plurality of through-holes 7 is greater than the upper limit, the plurality of through-holes 7 adjacent to one another may become so close that reduction of the center-to-center spacing of the plurality of through-holes 7 may fail, possibly leading to insufficient visibility when the illuminator 6 is illuminated.

Reinforcing Layer

The reinforcing layer 2 is formed from a transparent resin composition containing a resin as a main component. A coated surface that laminates the coating layer 3 in the interiors of the plurality of through-holes 7 may be formed by having the resin composition that forms the reinforcing layer 2 enter into the plurality of through-holes 7. Thus, light is diffused near the front face side of the plurality of through-holes 7, enabling enlargement of the angle of visibility of the decorative member, even when the coating layer 3 is relatively thin.

The main component of the reinforcing layer 2 is preferably a thermoplastic resin, and examples thereof include: an acrylic resin, which has superior transparency; polystyrene, which has superior workability; polycarbonate, which has superior strength; and the like. The reinforcing layer 2 may have a plurality of layers, such as, for example, a dual layer structure with a substrate layer on the back face side and an adhesive layer on the front face side.

The lower limit of the average thickness of the reinforcing layer 2 (except for the interiors of the plurality of through-holes 7) is preferably 1.0 mm and more preferably 1.5 mm. The upper limit of the average thickness of the reinforcing layer 2 is preferably 6.0 mm and more preferably 5.0 mm. In a case in which the average thickness of the reinforcing layer 2 is less than the lower limit, the strength of the decorative member may be insufficient. Conversely, in a case in which the average thickness of the reinforcing layer 2 is greater than the upper limit, the distance between the veneer 1 and the masking layer 4 will increase, possibly leading to an insufficient angle of visibility and making the characters or images formed by light from the illuminator 6 indistinct.

Coating Layer

The coating layer 3 is laminated to the front face side of the veneer 1 and fills (at least innermost portions of) the interiors of the plurality of through-holes 7. In other words, the coating layer 3 is present in continuity into the interiors of the plurality of through-holes 7 in planar view. In particular, the portion of the coating layer 3 that is laminated to the interiors of the plurality of through-holes 7 diffuses light emitted from the illuminator 6, thereby increasing the angle of visibility of the decorative member. The coating layer 3 preferably includes a light diffusing agent for the purpose of diffusing light emitted from the illuminator 6 so as to increase the angle of visibility of the decorative member.

The lower limit of the average thickness of the coating layer 3 on the front face side of the veneer 1 (the portion not including the plurality of through-holes 7) is preferably 5 µm, and more preferably 10 µm. The upper limit of the average thickness of the coating layer 3 on the front face side of the veneer 1 is preferably 80 µm and more preferably 50 µm. In a case in which the average thickness of the coating layer 3 on the front face side of the veneer 1 is less than the lower limit, the front face side of the veneer 1 may have insufficient protection, or it may not be possible to sufficiently fill the interiors of the plurality of through-holes 7 with the coating layer 3. Conversely, in a case in which the average thickness of the coating layer 3 on the front face side of the veneer 1 is greater than the upper limit, it may become necessary to increase the viscosity of the paint, and thus the formation of the coating layer 3 in the interiors of the plurality of through-holes 7 may fail.

Examples of the main component of the coating layer 3 include polyurethanes, polyesters, acrylic resins, and the like. Of these, polyurethanes may be particularly suitably used, as they are easy to handle and have superior weather resistance.

For the light diffusing agent which may be included in the coating layer 3, for example, fine particles of an acrylic resin, a styrene resin, silica, silicone, calcium carbonate, barium sulphate, or the like; a wax such as paraffin wax, polyethylene wax, or polypropylene wax; or the like may be used.

The lower limit of the content of the light diffusing agent in the coating layer 3 is preferably 5% by mass and more preferably 8% by mass. The upper limit of the content of the light diffusing agent in the coating layer 3 is preferably 15% by mass and more preferably 12% by mass. In a case in which the content of the light diffusing agent in the coating layer 3 is less than the lower limit, it may not be possible to sufficiently improve the angle of visibility of the decorative member. Conversely, in a case in which the content of the light diffusing agent in the coating layer 3 is greater than the upper limit, it may be difficult to evenly create the coating layer 3.

The lower limit of the specular glossiness (gloss) of the coating layer 3 is preferably 1 and more preferably 3. The upper limit of the specular glossiness of the coating layer 3 is preferably 30 and more preferably 10. In a case in which the specular glossiness of the coating layer 3 is less than the lower limit, the amount of light transmitted through the plurality of through-holes 7 may be reduced, possibly leading to insufficient visibility. Conversely, in a case in which the specular glossiness of the coating layer 3 is greater than the upper limit, it may not be possible to sufficiently diffuse the light transmitted through the plurality of through-holes 7, possibly leading to an insufficient angle of visibility.

Masking Layer

By being laminated to the back face side of the reinforcing layer 2 and partially shielding light from the illuminator 6, which emits surface light, the masking layer 4 establishes outlines of characters or figures and prevents the outlines from blurring. The masking layer 4 includes a plurality of apertures corresponding to the plurality of through-holes 7 of the veneer 1, or one or a plurality of apertures which form characters or designs which encompass the plurality of through-holes 7.

For the masking layer 4, for example, a black resin sheet, a resin film with vapor-deposited metal, a metal foil, or the like provided with apertures may be used; alternatively, it is permissible to use, for example, a light shielding film or the like produced by laminating chrome or the like to a transparent substrate formed from glass or the like, and then performing patterning.

Touch Sensor

The touch sensor 5 is a sensor that detects, through the coating layer 3, the veneer 1, the reinforcing layer 2, and the masking layer 4, a contact when someone has touched the front face side of the decorative member. The decorative member may be configured such that the illuminator 6 is lit in response to an operation of the touch sensor 5.

It is preferred that the touch sensor 5 is installed onto a back face side of a region of the veneer 1 in which the plurality of through-holes 7 have not been formed.

A capacitive touch sensor may be suitably used as the touch sensor 5 to allow for operation through the coating layer 3, the veneer 1, the reinforcing layer 2, and the masking layer 4.

Illuminator

For example, one or a plurality of LEDs, fluorescent lamps, or the like may be used for the illuminator 6. In addition, it is preferred that the light source is configured such that the amount of light emitted from the apertures of the masking layer 4 during lighting is approximately uniform. Accordingly, as illustrated in the drawings, it is possible to configure the illuminator 6 to be a plurality of light sources installed on a substrate.

In addition, the illuminator 6 may be configured such that partial lighting or turning off is enabled. By enabling the illuminator 6 to be partially lit or turned off in this way, it is possible to display character information or the like on the decorative member. Specific examples of the illuminator 6 which may be used include a matrix panel with LEDs arranged vertically and horizontally; as well as an emission display device of a well-known 7-segment display type or 14-segment display type, each having 7 or 14 rod-shaped emitters.

Manufacturing Method

The decorative member may be manufactured by using a manufacturing method of a decorative member according to another embodiment of the present invention.

Figure 2:
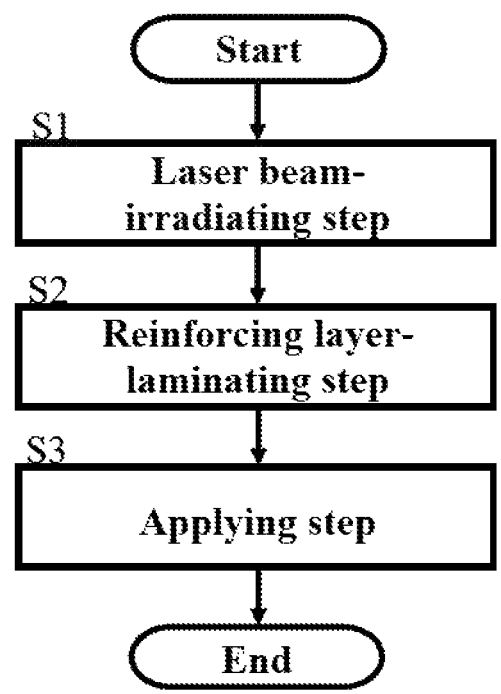
FIG. 2 is a flow chart illustrating a manufacturing procedure for the decorative member in FIG. 1.

As shown in FIG. 2, the manufacturing method of the decorative member includes: irradiating a veneer 1 with a laser beam to form a plurality of through-holes 7 (step S1: laser beam-irradiating step); laminating a transparent reinforcing layer 2 to a back face side of the veneer 1 in which the plurality of through-holes 7 have been formed (step S2: reinforcing layer-laminating step); and applying a paint onto a front face side of the veneer 1 to which the reinforcing layer 2 has been laminated (step S3: applying step).

Laser Beam-Irradiating Step

In step 51, the laser beam-irradiating step, the plurality of through-holes 7 are formed in the veneer 1 through irradiation with a laser beam. Forming the plurality of through-holes 7 with a laser beam in this way enables the formation of the plurality of through-holes 7, which are minute, in a rapid and accurate way.

Specifically, the wavelength of the laser beam used to irradiate the veneer 1 is preferably 10 nm or more and 10,600 nm or less, and for example, a $CO_2$ laser or the like may be used. In addition, the output of the laser beam used to irradiate the veneer 1 should be appropriately adjusted in accordance with processing conditions, but is preferably 1 W or more and 200 W or less.

Reinforcing Layer-Laminating Step

In step S2, the reinforcing layer-laminating step, the reinforcing layer 2 is laminated to the back face side of the veneer 1 through, for example, insert molding, hot pressing, or the like. During this step, the formation materials of the reinforcing layer 2, in a molten state, are made to flow inside the plurality of through-holes 7, enabling the formation of the coating layer 3 in the interiors of the plurality of through-holes 7 in a region close to the apertures on the front face side in the applying step that follows. As a result, diffused light becomes more easily emitted from the plurality of through-holes 7, and therefore the angle of visibility can be increased efficiently.

Applying Step

In step S3, the applying step, a paint is applied onto the front face side of the veneer 1, with the reinforcing layer 2 laminated to its back face side and the plurality of through-holes 7 sealed; this applying forms the coating layer 3, which is present in continuity to the front face side of the reinforcing layer 2, which is exposed to the interiors of the plurality of through-holes 7.

In terms of the paint to be applied, a delustering paint that includes a light diffusing agent may be suitably used. The paint may be either an oil paint or a water paint.

Advantages

Due to the plurality of through-holes 7 being formed in the veneer 1, the decorative member is able to transmit light from the illuminator 6, which is installed on the back face side. In addition, as the coating layer 3 is laminated to the front face side of the veneer 1 and fills the interiors of the plurality of through-holes 7, the decorative member diffuses light from the illuminator 6 that is emitted from the plurality of through-holes 7, creating a large angle of visibility at which light from the illuminator 6 can be seen.

Second Embodiment

Figure 3:
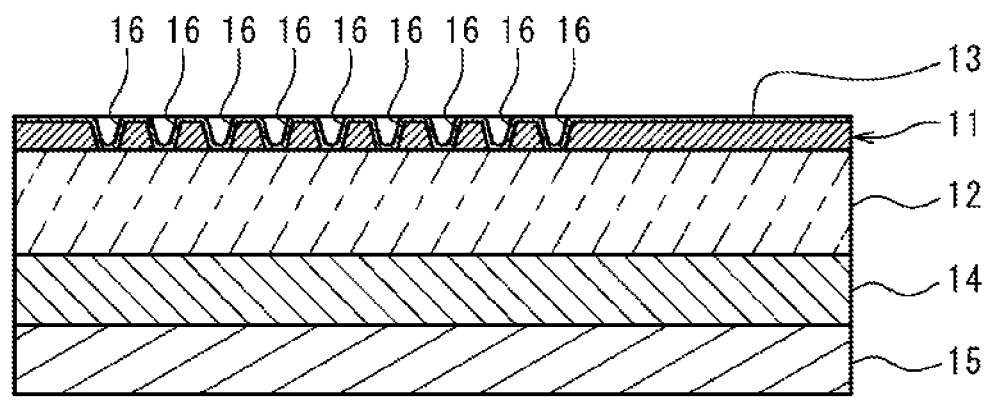
FIG. 3 is a schematic cross-sectional view of a decorative member according to an embodiment that differs from FIG. 1.

FIG. 3 shows a decorative member according to a still other embodiment of the present invention. Similarly to the decorative member illustrated in FIG. 1, this decorative member can be used, for example, as an interior panel in an automobile or the like.

The decorative member includes a veneer 11 made of wood, a transparent reinforcing layer 12 laminated to a back face side of the veneer 11, a coating layer 13 laminated to a front face side of the veneer 11, a masking layer 14 laminated to a back face side of the reinforcing layer 12, and an illuminator 15 installed on the back face side of the masking layer 14.

Veneer

The veneer 11 has a plurality of through-holes 16, which transmit light from the illuminator 15 to the front face side. Innermost portions of the plurality of through-holes 16 are filled with the coating layer 13 so as to cover a front face side of the reinforcing layer 12.

A material and an average thickness of the veneer 11 in the decorative member in FIG. 3 may be similar to the material and average thickness of the veneer 1 of the decorative member in FIG. 1.

Through Holes

The plurality of through-holes 16 of the veneer 11 are formed systematically and with a constant pitch over a wide region so that the central axis of each hole extends in a thickness direction of the veneer 11.

In addition, in the decorative member according to this embodiment of the present invention, the plurality of through-holes 16 are formed with a tapered shape in which their diameters expand toward the front face side. By having the plurality of through-holes 16 be tapered in this manner, with diameters that expand toward the front face side, the apertures of the plurality of through-holes 16 on the front face side of the veneer 11 are enlarged, thus enabling an increase in an angle of visibility and making it easier to continuously form the coating layer 13.

An average diameter, average center-to-center spacing, and taper angle of the plurality of through-holes 16 in the decorative member in FIG. 3 may be set similarly to the average diameter, average center-to-center spacing, and taper angle of the plurality of through-holes 7 of the decorative member in FIG. 1. In other words, the average diameter and the average center-to-center spacing are determined based on the apertures of the plurality of through-holes 16 on the front face side of the veneer 11. The taper angle is the angle value with respect to central axes of the plurality of through-holes 16, and the angle direction of the taper angle with respect to the central axes is opposite to that of the plurality of through-holes 7 of the decorative member in FIG. 1; however, the taper angle is similarly expressed as a positive value.

Reinforcing Layer

The reinforcing layer 12 contains a resin as a main component and is formed from a transparent resin composition. A material quality and average thickness of the reinforcing layer 12 in the decorative member in FIG. 3 may be set similarly to the material quality and average thickness of the reinforcing layer 2 in the decorative member in FIG. 1.

Coating Layer

The coating layer 13 is laminated to the front face side of the veneer 11 and fills the interiors of the plurality of through-holes 16. In particular, the portions of the coating layer 13 that are laminated to the interiors of the plurality of through-holes 16 diffuse light emitted from the illuminator 15, thereby increasing the angle of visibility of the decorative member. The coating layer 13 preferably includes a light diffusing agent for the purpose of diffusing light from the illuminator 15 so as to increase the angle of visibility of the decorative member.

Except for a point that the shape of the coating layer 13 differs in accordance with the plurality of through-holes 16 in the veneer 11, the coating layer 13 in the decorative member in FIG. 3 may be made similarly to the coating layer 3 in the decorative member in FIG. 1.

Masking Layer

The masking layer 14 in this embodiment of the present invention is formed from a liquid crystal panel and the regions that transmit light from the illuminator 15 may be optionally altered. Making the masking layer 14 an active mask in this way enables more information to be displayed using the decorative member.

The masking layer 14 formed from a liquid crystal panel may have a touch sensor on a front face side.

Illuminator

As the illuminator 15, for example, a backlight module for a liquid crystal display panel or the like may be used. A liquid crystal display panel unit that integrates both the illuminator 15 and the masking layer 14 may be used.

Advantages

Due to the plurality of through-holes 16 being formed in the veneer 11, the decorative member is able to transmit light from the illuminator 15, which is installed on the back face side. Further, as the coating layer 13 is laminated to the front face side of the veneer 11 and fills the interiors of the plurality of through-holes 16, the decorative member diffuses light from the illuminator 15 that is emitted from the plurality of through-holes 16, creating a large angle of visibility at which light from the illuminator 15 can be seen.

OTHER EMBODIMENTS

The embodiments described above do not restrict the constituent features of the present invention. Therefore, constituent elements of each part of the above-described embodiments may be omitted, replaced, or added based on the description in the present specification and common technical knowledge, and such omission, replacement, and addition should be construed as falling within the scope of the present invention.

The decorative member may be without the touch sensor, and may light or turn off the illuminator in response to input signals from an external source or the like. In addition, the touch sensor for the decorative member may be installed between the masking layer and the reinforcing layer.

The decorative member may be without the masking layer and the illuminator. In this case, for example, a smartphone or the like may be positioned on the back face side, allowing images from the smartphone or the like to be visible through the decorative member. In addition, if the illuminator is able to sufficiently limit its light emission region, the masking layer may be omitted.

The decorative member may include a transparent resin layer further on the front face side ahead of the coating layer to protect the veneer and impart gloss thereto.

The decorative member may have a backing material such as, for example, a woven fabric, a non-woven fabric, or the like on the back face side of the veneer. In this case, the backing material may be adhered to the veneer before the plurality of through-holes are formed via laser machining, so as to form the plurality of through-holes also in the backing layer.

The decorative member according to the present disclosure may be used as an exterior material for game consoles, audio equipment, musical instruments, smartphones, and the like, but may be particularly suitably used in interior panels for automobiles.

What is claimed is:

1. A decorative member comprising:
   a veneer made of wood comprising a plurality of through-holes which transmit light from a back face side to a front face side;
   a transparent reinforcing layer laminated to a back face side of the veneer; and
   a coating layer which is laminated to a front face side of the veneer and fills interiors of the plurality of through-holes, wherein
   the plurality of through-holes are in a tapered shape in which their diameters expand toward the back face side of the veneer.

2. The decorative member according to claim 1, wherein the coating layer comprises a light diffusing agent.

3. The decorative member according to claim 2, wherein a percentage content of the light diffusing agent in the coating layer is 5% by mass or more and 15% by mass or less.

4. The decorative member according to claim 1, wherein a specular glossiness of the coating layer is 1 or more and 30 or less.

5. The decorative member according to claim 1, comprising a region in which an average diameter of the plurality of through-holes on the front face side of the veneer is 0.10 mm or more and 0.40 mm or less, and an aperture percentage due to the plurality of through-holes is 3% or more and 20% or less.

6. The decorative member according to claim 1, further comprising a masking layer which is laminated to a back face side of the reinforcing layer and partially shields light directed from the back face side to the front face side.

7. The decorative member according to claim 1, further comprising an illuminator which irradiates the back face side of the veneer with the light.

* * * * *